April 5, 1966  C. E. FRANK  3,243,955
AFTERBURNER FUEL CONTROL MECHANISM
Filed Sept. 13, 1960  2 Sheets-Sheet 2

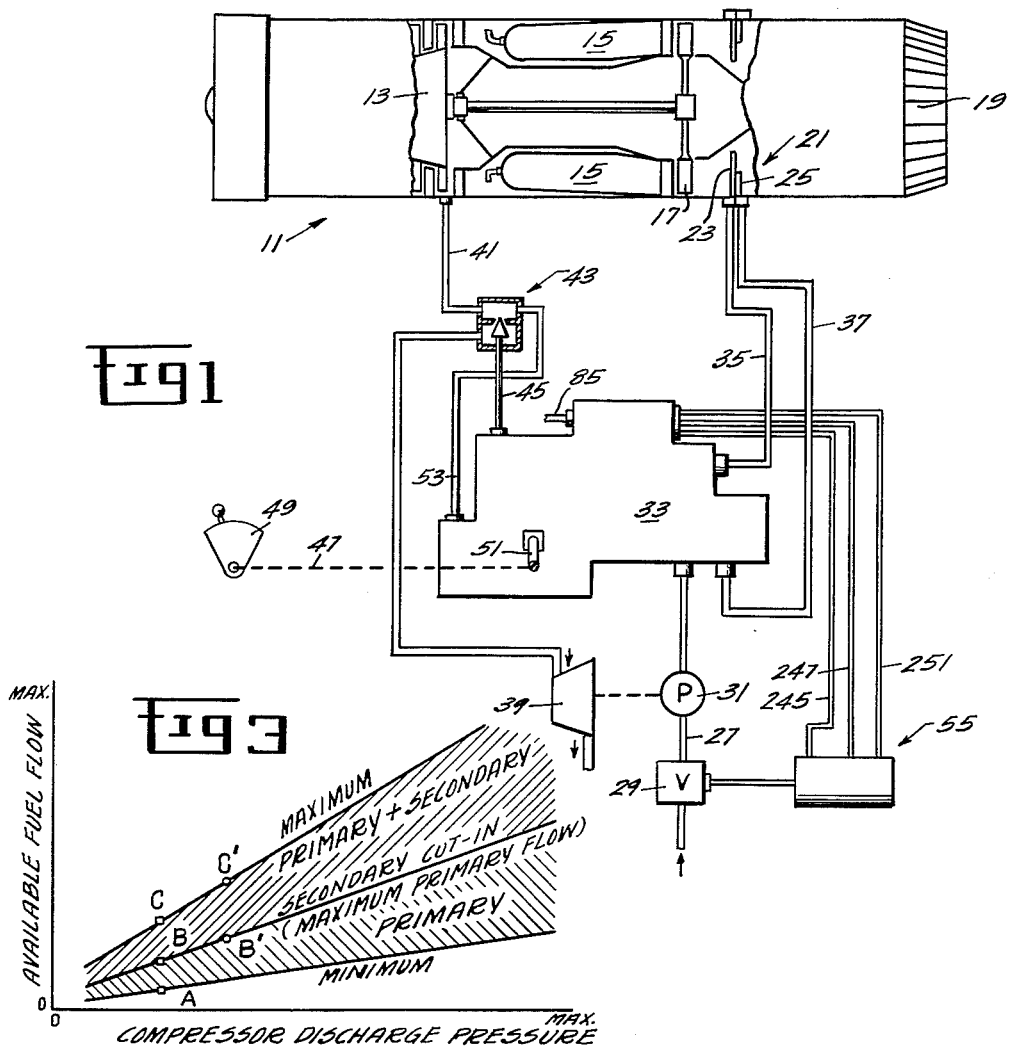
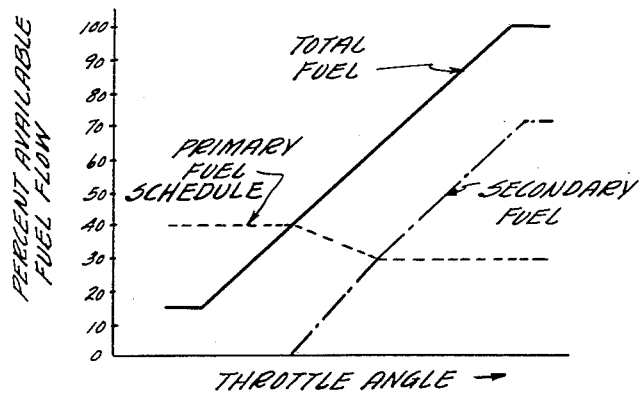

INVENTOR.
CARL E. FRANK
BY Harold H. Green Jr.
ATTORNEY—

United States Patent Office 3,243,955
Patented Apr. 5, 1966

3,243,955
AFTERBURNER FUEL CONTROL MECHANISM
Carl E. Frank, Loveland, Ohio, assignor to General Electric Company, a corporation of New York
Filed Sept. 13, 1960, Ser. No. 55,630
2 Claims. (Cl. 60—35.6)

This invention relates generally to fuel supply and control mechanism for turbine engines and more particularly relates to fuel control mechanism for regulating the supply of fuel to afterburners of aircraft turbojet engines.

As is well known, the use of afterburning for augmenting turbojet engine thrust affords a very substantial increase in total propulsive thrust with only slight increase in weight and size of the overall engine. While afterburning usually is regarded as offering something less than best fuel economy, there are many applications wherein fuel economy is a less critical factor than available thrust, particularly during such short-duration conditions as take-off or interception and combat in the case of military aircraft. Afterburning engines have found wide use in these and other applications wherein maximum available thrust is the controlling consideration.

The afterburner combustion mechanism utilized in engines of this type commonly includes two or more distinct burning zones only one of which is supplied with fuel initially, with the other burner or burners then being cut in as the total flow of afterburner fuel increases to maximum thrust level. The necessity for such multiple burner construction arises by reason of the fact that fuel-air ratio in the afterburner must be kept between predetermined minimum and maximum limits if the fuel is to burn properly, and at relatively low values of afterburner fuel flow the fuel if distributed uniformly over the entire cross-sectional area of the engine tailpipe would not form a fuel-air mixture adequately rich to support proper combustion. It therefore is the practice to provide two or more distinct burner zones so that fuel-air mixtures adequately rich for proper combustion may be maintained locally adjacent one of the burners, even at afterburner fuel flow rates too low to provide burnable fuel-air mixtures throughout the afterburner.

Typically, total flow to the afterburner is held between minimum and maximum limits both of which are made variable as a function of air flow rate in the afterburner, the necessary measure of air flow being obtained by a bellows or like sensor directly responsive to the engine compressor discharge pressure. This pressure bears sufficiently precise proportionality to air flow rate to serve the purpose, and is simply measured. The maximum and minimum limits thus imposed on afterburner fuel flow assure that afterburner fuel-air ratios will remain below an upper limit above which the fuel-air mixture would be too rich for proper combustion, and will remain above a lower limit below which the fuel-air mixture would be too lean to support combustion. Between these maximum and minimum limits and within the available fuel flow range defined by them, any desired fraction of the available flow range may be selected by adjustment of the engine throttle lever which is connected into the afterburner control in appropriate manner to permit this.

The maximum and minimum limits on afterburner fuel flow can properly serve their intended purposes only if the total fuel flow is distributed in predetermined controlled manner between the several burner elements which together constitute the afterburner structure, since otherwise there can be localized areas within the afterburner wherein fuel-air ratios are excessive and, at the same time, other areas wherein fuel-air ratios are too low to support combustion. This necessary control of fuel flow distribution between burner elements commonly has been accomplished by means responsive to the fuel pressure, with all the fuel being ducted to one burner until fuel pressure reaches some predetermined level at which the other burner or burners are sequentially cut in by valve means responsive to the build-up of fuel pressure.

While prior systems of this type have provided generally satisfactory operation they have left something to be desired particularly with respect to their performance at the point of cross-over or transition between single burner operation and multiple burner operation. Frequently the cut-in or cut-out of the secondary burner or burners results in too large a reduction in fuel flow to the primary burner, with consequent failure of combustion at that burner—a condition commonly called flame-out. Even in the absence of flame out there may be such roughness in the transition between single and multiple burner operation as to cause abrupt changes in engine thrust level and other transient effects some of which may reflect back to the engine main fuel control and area nozzle control with deleterious effect on operation of the basic engine as well as on that of the afterburner.

The afterburner fuel supply and control mechanism of the present invention has as a primary objective the alleviation of these and other problems characteristic of the supply and control systems heretofore utilized with afterburners of the type described. It is also an object of the invention to provide, for use with afterburning turbojet engines, fuel supply and control systems characterized by good smoothness of transition from nonafterburning to single burner afterburning as well as from single to multiple burner operation and back.

Another object of the invention is the provision of fuel supply and control mechanism for turbojet afterburners capable of controlling afterburner fuel-air ratios under all conditions of afterburner operation with sufficient precision as to minimize the frequency of flame-out and other afterburner malfunctions attributable to deviations from proper fuel-air ratios in the afterburner. Still another object of the invention is the provision of afterburner fuel controls characterized by simplicity of construction, reliability of operation and flexibility of adjustment permitting ready adaptability to different engines.

In carrying out the invention in one preferred embodiment, there is provided in combination with a turbojet powerplant including an afterburner assembly having at least two burner elements, an afterburner fuel supply control mechanism operative to meter total flow of fuel to the afterburner as a combined function of throttle angle and compressor discharge pressure. In accordance with the invention, this total flow is divided between the burners by a pair of valve means one of which meters fuel flow to the primary burner as a function of compressor discharge pressure and, optionally, also as a function of throttle angle, with the other valve means serving as a pressure regulating valve operative to hold constant pressure drop across the metering valve by shunting to the secondary burner such portion of the total afterburner flow as may be necessary to maintain this pressure drop constant. With this arrangement, fuel-air ratios at the primary burner always are held between predetermined minimum and maximum limits assuring proper combustion of fuel adjacent that burner, and while fuel-air ratios adjacent the secondary burner may vary widely the proximity of the secondary burner to the primary assists in maintaining proper combustion at the secondary burner whenever the primary is operating. Fuel-air ratio control at the secondary burner may if desired be optimized by use of a throttle angle input to the primary burner metering valve scheduled to cut back slightly on primary burner flow and thus increase secondary burner flow more rapidly at the point of transition to multiple burner operation.

The invention will be further understood and its various objects, features and advantages more fully appreciated by reference to the appended claims and the following detailed description when read in conjunction with the accompanying drawings, wherein:

FIG. 1 illustrates schematically a jet engine incorporating an afterburner with fuel supply and control mechanism in accordance with the invention;

FIG. 3 is a curve describing interrelationships between available fuel flow and compressor discharge pressure in the control mechanism of FIG. 2; and FIG. 4 is a curve describing interrelationships between fuel flow and throttle angle in the control mechanism of FIG. 2.

Figure 2:
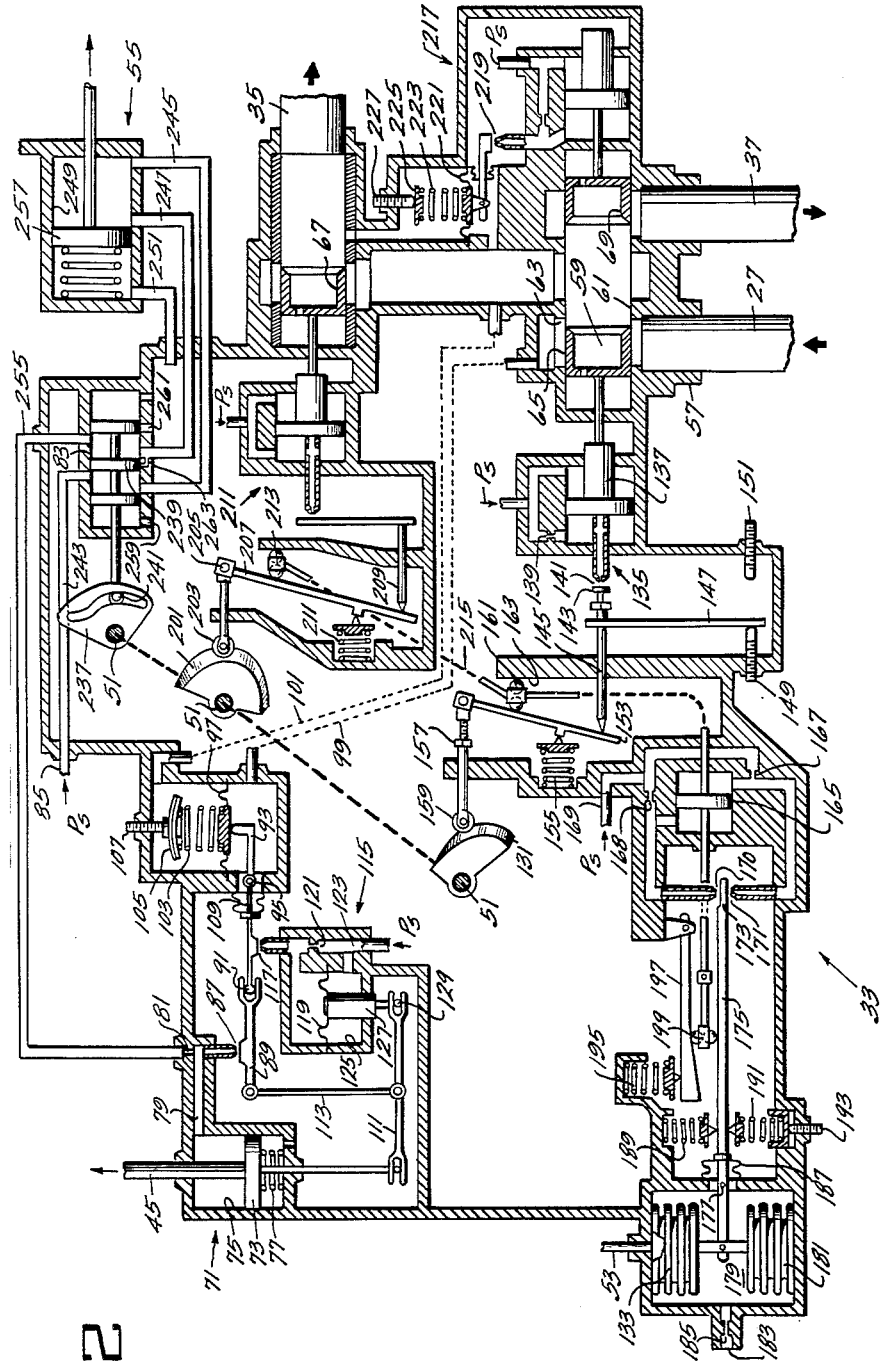
FIG. 2 is a schematic diagram of the fuel control mechanism of FIG. 1.

With continued reference to the drawings, wherein like reference numerals have been used throughout to designate like elements, FIG. 1 illustrates the invention as incorporated in an aircraft turbojet engine designated generally by reference numeral 11. The engine shown is of conventional construction comprising a compressor 13 supplying air under pressure to a plurality of combustion chambers 15 the combustion gases from which discharge through a turbine 17 and then efflux through a jet nozzle 19 to provide the desired propulsive effect.

In the engine tailpipe between the turbine 17 and exit nozzle 19 is mounted an afterburner assembly designated generally by reference numeral 21 and comprising two afterburner elements 23 and 25. These burner elements may be arranged in concentric pattern as illustrated or if preferred may be arranged in sector pattern, both such arrangements being known in the art and applicable to use in combination with the control system of the present invention.

Regardless of the particular pattern in which the afterburner elements are disposed, one of the burner elements constitutes a primary burner to which fuel always is supplied during afterburner operation and the other constitutes a secondary burner to which fuel is supplied only during full afterburner operation for maximum powerplant thrust. In controlling total fuel flow to the burner 21 and in apportioning this total flow between the two burner elements 23 and 25, fuel-air ratios within the afterburner must as previously explained be held between predetermined limits particularly during transition from one thrust setting to another. The afterburner fuel supply and control system of the present invention provides this desired regulation of fuel flow as hereinafter explained.

Fuel for the afterburner 21 is supplied from a tank (not shown) through a line 27 having interposed therein a shut-off valve 29 and a turbine-driven pump 31 preferably though not necessarily of centrifugal type. From pump 31, the fuel flows to and through a control system 33 which serves to divide the flow between a first conduit 35 connecting to the primary burner element 23 and a second conduit 37 connecting to the secondary burner element 25. The control system 33 also provides control of total fuel flow by controlling the motive fluid supply to the air turbine 39 which drives the fuel pump.

As shown, the motive fluid supply for air turbine 39 is constituted by compressor discharge air tapped off from the main engine compressor 13 through a line 41 having interposed therein a control valve 43. This valve regulates the speed of air turbine 39 and thus regulates the fuel output of pump 31, and is itself controlled by a push-rod 45 suitably connected to the valve and actuated by the control system 33 as hereinafter explained.

Operation of the control system 33 is responsive to two control inputs. One input is a mechanical link—indicated diagrammatically by dotted line 47—between control input shaft 51 and a throttle lever 49 which preferably is the main engine throttle lever but may if preferred be a separate throttle controlling only the afterburner. The second control input is compressor discharge pressure, which may conveniently be measured in the line 41 leading to the air turbine 39 and connected into the control system 33 through a branch line 53. In addition to its control functions previously mentioned, the control system 33 also operates a shut-off valve 29 interposed in the fuel supply line 27, by operation of an actuator 55 preferably interlocked with operation of the remainder of the system in a manner to be explained.

With reference now to FIG. 2, the control system 33 of FIG. 1 is shown in schematic form. The fuel supply line 27 connects into the control through a fitting 57 and from this fitting the fuel passes through a main metering valve designated generally by reference numeral 59, which meters total flow to the afterburner. This metering valve 59 comprises a valve sleeve 61 having ports 63 therein the open area of which is controlled by a valve piston 65 slidable within the sleeve 61. From the metering valve 59, the fuel flows to a flow divider assembly comprising two valves 67 and 69, and from those valves to one or the other of the supply lines 35 and 37 to the afterburner primary and secondary burners, respectively.

In order to assure that fuel flow through the metering valve 59 is accurately proportioned to its open area, this valve has constant pressure drop held across it, with regulation in this manner being accomplished by adjustment of the speed of the air turbine 39 (FIGURE 1) and of the pump 31 driven thereby. As previously noted, air turbine speed is controlled by an air modulating valve 43 which in turn is controlled by a servo actuator 71 (FIGURE 2) connected to push rod 45. This actuator comprises a servo piston 73 reciprocable within a cylinder 75 in response to unbalance between two opposed forces, one applied by a loading spring 77 and the other by the pressure of fluid contained in cylinder 75 above the piston 73.

This cylinder space is supplied with servo fluid under pressure through a conduit 79 which connects through a fixed orifice 81 and an interlock valve 83 described hereinafter, to an inlet fitting 85 to which servo fluid under pressure is supplied from any suitable source (not illustrated). Fluid pressure within the cylinder above piston 73 is bled through a pilot valve 87 which, depending upon the size of its open area as compared to that of the orifice 81, determines the fluid pressure level maintained in the servo cylinder. The balance or unbalance of the fluid pressure derived force and spring derived force on servo piston 73 thus is determined by pilot valve 87.

The system just described constitutes a bleed servo the control input to which is the position of pilot valve 87. The "flapper" or movable element of this valve comprises a floating lever member 89 having a pin and slot connection as at 91 to a second lever member 93 which is pivotally mounted as at 95 to fixed housing structure. The end of this second lever member remote from its pin and slot connection to lever 89 bears against a diaphragm 97 the opposite sides of which are subjected to the upstream and downstream pressures, respectively, at the metering valve 59. These pressures are communicated to the chamber containing diaphragm 97 through lines 99 and 101, respectively. The diaphragm 97 is spring loaded by a spring 103 in opposition to the higher of the two metering valve pressures, i.e., the pressure upstream of the metering valve, so that the opposed force loads on the diaphragm 97 balance against each other when the metering valve pressure differential times the effective area of the diaphragm 97 is just equal to the loading force of the force spring 103.

Preferably this spring force is made adjustable as by a retainer 105 mounted for longitudinal adjustment by rotation of a threaded stud member 107. The retainer element 105 preferably is in the form of a disk fabricated of temperature sensitive bimetallic material so that the disk formed of these composite materials deforms slightly upon change of temperature, to thus vary the loading force applied by spring 103 as a function of fuel temperature. With this arrangement, compensation for differences in specific gravity and heat content of different fuels to be used may be effected by manual adjustment of the stud 107 and automatic compensation for changes in fuel density with changes in temperature of the fuel are effected by the bimetallic disk 105.

In the diaphragm assembly just described, any unbalance between the opposed forces acting on diaphragm 97 and arising by reason of deviation of the metering valve pressure drop from the set value will cause movement of lever 93 about its pivot 95, such movement being permitted by flexible seal element 109. Movement of lever member 93 is communicated through its pin and slot connection 91 to lever member 89, with consequent adjustment of the open area of pilot valve 87. The resultant change in pressure level in the servo cylinder 75 above the servo piston 73 will cause movement of the servo piston and thus effect adjustment of the turbine air modulating valve 43. This adjustment will be in a direction and to an extent as necessary to reset turbine speed and fuel pump speed to values such as to re-establish the desired fuel pressure drop across the main metering valve 59. As the servo piston 73 moves to effect this readjustment it acts through a floating lever 111 and feedback link 113 to shift the free end of lever member 89 in a direction to null its input and to restore the servo system to balance by position feedback.

In addition to this position feedback, a stabilizing feedback signal also may be provided if desired by a reset or stabilizing assembly designated generally by reference numeral 115. This assembly comprises a pilot valve 117 the "flapper" or movable element of which is constituted by the input lever member 93. Pilot valve 117 controls the pressure level above a diaphragm 119, by variation of the pilot valve open area relative to the open area of a fixed orifice 121 which is interposed in the supply line connection 123 to a source (not shown) of servo fluid under pressure. This servo supply line 123 connects also into a chamber 125 below the diaphragm 119, and there acts upwardly against the diaphragm.

The effective areas against which these two fluid pressures act are different, however, by reason of a piston 127 affixed to the diaphragm 119 and projecting outwardly through the reset mechanism housing to provide a differential area enabling balance of the reset diaphragm and piston assembly with the fluid pressure above the diaphragm equal to some predetermined fraction of the pressure below the diaphragm. Should the opposed fluid pressures depart from this equilibrium relation due to movement of lever 93 and resulting change in open area of the pilot valve 117, the diaphragm and piston assembly then will move and communicate its movement through a pin and slot connection 129 to the right hand end of floating lever 111. This lever, acting through link 113, will reposition the lever elements 89 and 93 and effect corresponding adjustment of the open areas of the pilot valves 87 and 117 controlled thereby, to provide anticipation and thus stabilize the system against over-shoot and hunting.

In operation of the parts thus far described, the metering valve 59 controls total flow to the engine afterburner and is itself controlled to schedule such total flow in accordance with control inputs to be described hereinafter. In order to assure that total flow is accurately proportioned to the open area of the metering valve 59, and thus assure that fuel flow to the engine actually is in accordance with the control input to the metering valve, this valve has constant pressure drop held across it. Such pressure drop regulation is accomplished by control of the supply of motive fluid to the air turbine which drives the fuel pump supplying fuel to the metering valve.

Control of the turbopump air supply is made responsive to the metering valve pressure drop by a diaphragm 97 across which the pressures upstream and downstream of the metering valve are imposed, with the datum value of pressure drop being established by a spring 103 incorporating specific gravity and temperature compensating devices as explained. Any departure of metering valve pressure differential from the datum value will cause displacement of the diaphragm 97, which diaphragm displacement will act through servo pilot valve 87 and the servo motor 71 to readjust the air supply to the turbo pump and vary the pump output so as to re-establish the datum value of pressure differential across the main metering valve. The reset assembly 125 provides an anticipation or "lead" signal which serves to stabilize the operation of the pump control loop just described.

As previously mentioned, the metering valve 59 schedules total fuel flow to the engine afterburner as a combined function of throttle angle and compressor discharge pressure. In FIG. 2, the throttle angle input is through rotation of the throttle cam shaft 51 to which is affixed a throttle cam 131. The compressor discharge pressure signal is connected through conduit 53 opening into the interior of a bellows 133. The control inputs thus introduced coact, in the manner hereinafter explained, to operate the metering valve 59 through servo mechanism 135 of bleed type.

This servo comprises a differential area piston which on its smaller area side is subjected to the servo fluid supply pressure "Ps," and on its larger area side is subjected to a variable fluid pressure the value of which is determined by the relative areas of a fixed orifice 139 interposed in the connection to the servo fluid supply, and a valve orifice constituted by pilot valve 141. The "flapper" or movable element of this valve 141 is adjustably mounted as at 143 to a push-rod 145 having affixed thereto a stop member 147 which member is free for movement between two cooperating stop elements 149 and 151 both threadedly mounted for adjustment as shown. The stop element 149 provides a maximum flow limit, by limiting the movement of the servo pilot valve element 143 to the left and thus limiting movement of the metering valve 59 in opening direction. Stop element 151 serves in similar fashion to provide a minimum flow limit.

Push rod 145 bears against one end of a floating multiplier lever 153 loaded against the push-rod as by a spring 155 compressed between the multiplier lever and fixed housing structure as shown. The other end of lever 153 connects, through threaded adjustment means 157 further described hereinafter, to a cam follower 159 engaging the throttle cam 131.

Multiplier lever 153 pivots about its point of contact with a roller assembly 161 which is free to translate along a fixed ramp surface 163 to shift the pivot point of the lever and thus modify the multiplication ratio which it provides, i.e., to vary the proportion which exists between the magnitudes of movement of opposite ends of the multiplier lever. Roller assembly 161 is translated longitudinally with respect to multiplier lever 153 by a servo motor 165 preferably of differential area bleed type as illustrated. Thus, operation of servo motor 165 is dependent upon the relative open areas of fixed orifices 167 and 168, with respect to the open areas of valve orifices 170 and 171, the areas of which are differentially controlled by a flapper element 173.

Flapper 173 is carried by a lever 175 pivoted as at 177 at its point of passage through the housing wall and into bellows chamber 179. This bellows chamber contains the bellows 133 previously mentioned, into which is connected the compressor discharge pressure signal. Chamber 179 also contains a compensating bellows 181 which is connected in opposed relation to bellows 133 and is evacuated so as to compensate the bellows 133 for variations in ambient air pressure as communicated into the bellows chamber 179 through vent 183. Preferably, this vent contains a restricted orifice 185 to enable continued operation of the unit in the event of failure of bellows 133, the compensating bellows 181 then taking over to provide a less accurate but still usable measure of compressor discharge pressure. The bellows signal output lever 175, at its point of passage out of the bellows chamber, is suitably sealed as at 187 to isolate the air-filled bellows chamber from the remainder of the control housing which normally is fuel-filled, the seal 187 being of construction such as to permit at least limited pivotal movement of the lever 175 responsive to and indicative of bellows displacement.

As shown, the bellows lever 175 is force loaded by three springs 189, 191 and 195. Spring 189 provides a bias force the effective magnitude of which is reduced because canceled by the opposed spring 191. The outer end of this spring bears against a retainer element provided with threaded adjustment as at 193, which adjustment varies the spring loading against which the compressor discharge pressure derived force is balanced. The sensitivity of the compressor discharge pressure responsive unit may thus be varied for calibration purposes.

The third loading spring 195 forms part of a force feedback loop for nulling the compressor discharge pressure signal into the output servo 165. The spring 195 acts through a lever 197 providing force multiplication varying as necessary for force balance, with such variation of force multiplication being effected by movement of a roller assembly 199 directly linked to the servo piston 165 as shown.

Operation of the compressor discharge pressure sensing mechanism just described may perhaps best be understood by a summary of the sequence of actions resulting from a change in compressor discharge pressure, for example, in the increasing pressure direction. The increased pressure in bellows 133 will cause the force lever 175 to rotate counter-clockwise about its pivot 177 with consequent decrease in open area of pilot valve 170 and increase in area of pilot valve 171. Servo fluid pressure in the space to the left of servo piston 165 will tend to rise and the servo pressure left of the piston will tend to fall, causing movement of the servo piston to the right. The servo piston will take with it the roller assembly 199 and the movement of this assembly to the right will increase the effective lever arm of the spring 195 on the feedback lever 197.

The effective loading force of spring 195 accordingly will increase as necessary to balance against the increased force of bellows 133, and on completion of these various adjustments the parts will occupy a position such that the compressor discharge pressure derived force is again in equilibrium with the forces applied by springs 189 and 191 and by spring 195 the force multiplication ratio of which has been readjusted as necessary to restore force balance to the system. It will be noted that after such readjustment is completed all the parts except servo piston 165 and roller assembly 199 occupy precisely the same positions as before, hence the spring constants and temperature sensitivity of the several springs 189, 191 and 195, as well as of bellows 133 and 181, do not adversely affect the accuracy of the system.

The coaction between the compressor discharge pressure and throttle angle inputs to the control is such as to schedule total flow to the engine afterburner as a combined function of these inputs. Within the range of movement permitted the metering valve servo by the maximum and minimum limit stops 149 and 151, the compressor discharge pressure signal input acts through roller assembly 161 to control the metering valve servo in a manner to define upper and lower limit values of total fuel flow at the two extreme positions of the throttle cam 131. In effect, the compressor discharge pressure positioned roller assembly 161, by adjusting the multiplication ratio afforded by lever 153, defines maximum and minimum available fuel flow rates variable with and proportioned to compressor discharge pressure, and the throttle angle input through cam 131 then selects from this available range of total fuel flows such fraction as is desired by the operator and called for by adjustment of the throttle lever and cam 131.

The threaded adjustment 157 included in the link between multiplier lever 153 and throttle cam 159 permits variation of the fraction of available fuel flow range which is selected by the throttle cam at any given setting. Additionally, it is possible with this arrangement to make the lower limit on the available fuel flow range be of fixed value and to remain constant despite variations in compressor discharge pressure where this is desired. If the parts are so proportioned and adjusted that multiplier lever 153 lies parallel to the ramp surface 163 when the throttle cam is in minimum afterburner position, then obviously any movement of the roller assembly 161 responsive to changes in compressor discharge pressure will not affect fuel flow rate under these conditions. At throttle cam settings above minimum, operation of the system remains the same and the compressor discharge pressure provides the desired proportionality to afterburner air flow.

As previously noted, the very wide range through which afterburner fuel flow must be varied to provide desired variation of engine thrust augmentation precludes the use of a single burner element to handle the entire range of fuel flows. If such single unit were made sufficiently large to accommodate maximum required fuel flow it would then, at and near minimum flow, so widely distribute the fuel that burnable fuel air ratios would be difficult if not impossible to maintain over the entire burner area. There is also a very difficult problem of obtaining proper atomization of fuel at the burner spray nozzles where the range of fuel flow which must be handled by the nozzles is quite large. To avoid these problems the total fuel flow as metered by the main metering valve 59 in FIGURE 2 is divided downstream of that valve into a first portion ducted to the primary burner element 23 through flow line 35 and a second portion ducted to the secondary burner element through flow line 37, flow through these lines being controlled by the valves 67 and 69, respectively.

Valve 67 constitutes a metering valve similar in construction and operation to the main metering valve 59, but operative only to control fuel flow to the primary burner element. Such control is provided in accordance with the same input parameters as utilized in the control of the main metering valve, i.e., throttle angle and compressor discharge pressure. The throttle angle input is through a second throttle angle cam 201 fixed to the throttle shaft 51. The cam follower 203 has pivotal connection as at 205 to one end of a multiplier lever 207 the opposite end of which bears against a push-rod 209 providing position input to the metering valve servo 211. This servo is of bleed type similar in construction and operation to the bleed servos previously described and operates simply as a force amplifier to position the metering valve 67 directly in accordance with the position of push-rod 209.

The multiplier lever 207 is spring loaded as by a spring 211 against the cam and also against push-rod 209 and a movable pivot point constituted by a second roller assembly 213. This assembly, as indicated by dotted line 215, is connected directly to the roller assembly 161 and is positioned therewith as a direct function of compressor discharge pressure. The throttle angle and compressor discharge pressure inputs thus combined control operation of the primary burner metering valve 67 in coordination with the flow control afforded by the main metering valve 59, in a manner more fully explained hereinafter.

Like the main metering valve, the primary burner metering valve 67 has constant pressure drop held across it by a pressure regulating valve. In this case, however, the pressure regulating function is served by the valve 69 controlling fuel flow to the secondary burner element. The valve 69 controls flow to this burner element as necessary to hold constant pressure drop across metering valve 67 and to this end the pressure regulating valve 69 is actuated by a bleed servo designated generally by reference numeral 217 of differential area piston type.

The servo pilot valve 219 is controlled by a diaphragm 221 the opposite sides of which are exposed to fuel pressures upstream and downstream of the primary burner metering valve and which balance this differential pressure derived force against the force of a loading spring 223 preferably provided with temperature compensation as at 225 and specific gravity adjustment as at 227 similar in construction and operation to the elements 105 and 107 previously described.

In operation, the pressure regulating valve 69, by controlling fuel flow to the secondary burner element, holds constant pressure drop across the primary burner metering valve, thus assuring that actual fuel flow to the primary burner element is accurately proportioned to the open area of the primary burner metering valve and similarly accurately proportioned to the flow rate scheduled by the throttle angle and compressor discharge pressure inputs. In effect, the pressure regulating valve 69 remains closed and thus prevents flow of fuel to the secondary burner until such time as total fuel flow scheduled by the main metering valve 59 exceeds that scheduled by the primary burner metering valve 67, at which point pressure drop across the latter valve will exceed the design value and the pressure regulating valve 69 then will open to an extent as necessary to hold such desired value.

With reference now to FIG. 3, the curves shown in this figure illustrate graphically the operation of the total flow metering valve and primary burner metering valve as a function of compressor discharge pressure. The lowest of these curves represents minimum flow to the engine afterburner; the middle curve represents the point of cut-in of the secondary burner element; and the upper curve represents the maximum total flow to the primary and secondary burners together. The main metering valve 59 may, for any given compressor discharge pressure flow, select any desired fuel flow between point A on the minimum flow curve and point C on the maximum flow curve, or between any other two points similarly situated on a vertical straight line, i.e., at the same compressor discharge pressure. The primary metering burner valve 67 establishes the maximum value of primary burner fuel flow as shown at point B in FIG. 3, or at some point between the points A and B selected by throttle cam 201 in systems wherein this cam is included.

FIG. 3 also illustrates the operation of the system with a change in compressor discharge pressure. For example, with total flow set at point C the flow to the primary burner would be equal to B and the flow to the secondary burner would be the difference between flow C and flow B. As compressor discharge pressure increases, the total flow will increase from point C to point C'. Likewise, primary burner fuel flow will increase from point B to point B' and the increase in the difference between scheduled total and primary burner flow will go to the secondary burner. In this fashion, the control system of the invention assures that fuel-air ratios adjacent the primary burner always are at values such as to properly support fuel combustion at that burner. All fuel over this amount then is ducted to the secondary burner.

At the control point at which fuel first begins to flow to the secondary burner element, the relatively small amount of fuel then supplied to the secondary burner may not be adequate for good vaporization and distribution of the fuel at the burner nozzles. The second throttle cam 201 provides means for minimizing this problem by scheduling some reduction of primary burner flow at the point of cross-over, thus effecting a more rapid increase in the rate of fuel flow to the secondary burner nozzle and minimizing the time during which these nozzles are supplied with low fuel flow rates.

This feature of operation is illustrated graphically in FIG. 4, wherein the dotted line labeled "primary fuel" indicates the reduction in primary fuel flow scheduled at the point of transition to multiple burner operation, and the consequent more rapid increase in secondary burner fuel flow which follows as a result of this reduction in primary flow. The utilization of the second throttle cam 201 also is advantageous in that below the point of transition to multiple burner operation, improved control stability may be obtained by having the primary burner fuel flow rate scheduled substantially higher than the total fuel flow scheduled over this portion of the operating range, thus avoiding conflict in action of the total and primary fuel metering means.

As previously mentioned, the fuel shut-off valve in the fuel pump inlet is positioned by an actuator 55 (FIGURE 2) under control of the throttle lever, such control being asserted through a third throttle cam 237 and the interlock pilot valve 83 through which servo pressure fluid is supplied to the actuator and to the turbopump air valve. This interlock comprises a pilot spool element 239 positioned by cam follower means as at 241 operatively engaging the cam 237. Servo pressure fluid from inlet fitting 85 is ported into the pilot valve 239 through a line 243 and, when the pilot valve occupies its afterburner "on" position as illustrated, to a line 245 connected into the power cylinder 249 of actuator 55 adjacent one end thereof as shown. Adjacent its other end, the actuator cylinder 249 connects through line 251 into the control housing and from there to drain. Adjacent its center the actuator cylinder has connected into it a third line 247 which, when the actuator piston reaches the position shown, connects pressure fluid from within the actuator cylinder through pilot valve 239 and line 255 to the turbopump air valve servo, through orifice 81 as previously described.

In operation, when the throttle lever is adjusted to call for afterburner operation, the throttle shaft 251 and cam 237 occupy the positions shown, and servo pressure fluid may flow through line 243, through the pilot valve 239, and through line 245 into the actuator cylinder. The fluid there acts against the actuator piston 257 forcing it leftwardly to the position shown, and fluid then may flow through line 247 and through the pilot valve to line 255 connecting to the turbopump air valve servo, energizing that servo and enabling operation of the air turbine and turbopump. It will be noted that turbopump operation can begin only after the actuator piston 257 has completed its movement and fully opened the shut-off valve, since pressure fluid can not flow to the air valve servo except through the line 247 opened by movement of the actuator piston. In this fashion, energization of the air valve servo is positively prevented until such time as the shut-off valve actuator piston has fully opened the shut-off valve, thus forestalling any possibility of turbopump operation with the pump unloaded due to closed shut-off valve.

When the operator shifts the throttle shaft 51 in reduce thrust direction to stop further afterburning, pilot valve 239 moves to the right and disconnects line 243 from line 245 and connects the latter to drain, through port 259. At the same time, the center land of the pilot valve now blocks communication between the lines 247 and 255 thus depriving the air valve servo of its servo fluid supply and opening the supply line 255 to drain through a port 261 opening into the control housing. Vented to drain in this fashion, the shut-off valve actuator 55 and the air valve servo 71 move simultaneously to closed position to thus shut down the afterburner fuel supply system. Preferably pilot valve 239 includes a restricted flow passage as at 263 which remains open during shut down to permit limited flow of servo fluid constantly through the pilot valve and the actuator 55 for cooling purposes.

From the foregoing it is apparent that the afterburner supply and control systems of the present invention afford many significant advantages important among which is good regulation of afterburner total flow and of primary burner flow so as to maintain satisfactory fuel-air ratios at the primary burner irrespective of secondary burner fuel flow rates. Various modifications to the preferred embodiment illustrated are possible, of course, and as explained hereinabove include among them omission of the throttle angle input to the primary burner metering valve servo or, alternatively, connection of this input to the pressure regulating valve instead of the metering valve.

Certain preferred embodiments of the invention have been described and illustrated by way of example in the foregoing, but many modifications will occur to those skilled in the art and it therefore should be understood that the appended claims are intended to cover all such modifications as fall within the true spirit and scope of the invention.

What is claimed as new and desire to be secured by Letters Patent of the United States is:

1. In combination with burner structure including primary and secondary burner elements and means for supplying combustion air to said burner elements, means providing a measure of air supply rate, operator control input means including first and second actuator means, fuel supply means including a main fuel supply conduit branching into a first branch conduit connecting to said primary burner element and a second branch conduit connecting to said secondary burner element, means responsive to said air measure means and said first actuator means to regulate total flow in said main fuel supply conduit as a combined function of air supply rate and operator control input, first valve means in said first branch conduit responsive to said air measure means and said second actuator means to meter fuel flow in said first branch conduit as a combined function of air supply rate and operator control input, and second valve means in said second branch conduit including means responsive to the pressure drop across said first valve means and operative to hold constant said pressure drop by control of fuel flow in said second branch conduit, said second actuator means being effective to control the fuel flow in said first branch conduit at the point of transition when said second valve means opens, to cause said pressure drop responsive means to open said second valve means sufficiently to provide for effective burning at said secondary burner element.

2. In combination with a combustion gas turbine engine including an air compressor supplying combustion air to the engine and augmentation burner structure disposed downstream of the turbine and comprising primary and secondary burner elements, fuel supply means including a main fuel supply conduit branching into a first branch conduit connecting to said primary burner element and a second branch conduit connecting to said secondary burner element, a main metering valve interposed in said main fuel conduit to control total fuel flow, a primary burner metering valve interposed in said first branch conduit to control primary burner fuel flow, a pressure regulating valve interposed in said second branch conduit including means responsive to the pressure drop across said primary burner metering valve and operative to regulate the pressure drop across said primary burner metering valve by control of fuel flow to said secondary burner element, operator control input means including first and second actuator means, sensing means providing a measure of compressor discharge pressure, and first and second servo means respectively connected to actuate said main and primary metering valves, said first servo means being operative under control of said sensing means and said first actuator means, and said second servo means being operative under the control of said sensing means and said second actuator means, said second actuator means being effective to actuate said second servo means to control the fuel flow in said first branch conduit at the point of transition when said second valve means opens, to cause said pressure drop responsive means to open said second valve means sufficiently to provide for effective burning at said secondary burner element.

References Cited by the Examiner

UNITED STATES PATENTS

| 2,916,876 | 12/1959 | Colley | 60—39.28 |
| 2,964,904 | 12/1960 | Davies | 60—39.28 |
| 3,007,303 | 11/1961 | Williams | 60—35.6 |

FOREIGN PATENTS

| 824,752 | 12/1959 | Great Britain. |

JULIUS E. WEST, *Primary Examiner.*

SAMUEL LEVINE, *Examiner.*

M. NEWMAN, *Assistant Examiner.*